(12) United States Patent
Brahma et al.

(10) Patent No.: US 11,905,904 B2
(45) Date of Patent: Feb. 20, 2024

(54) SYSTEMS AND METHODS FOR ULTRA-LOW NOX COLD START WARMUP CONTROL AND FAULT DIAGNOSIS

(71) Applicant: Cummins Inc., Columbus, IN (US)

(72) Inventors: Avra Brahma, Fishers, IN (US); Yongsoon Yoon, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/884,473

(22) Filed: Aug. 9, 2022

(65) Prior Publication Data
US 2022/0381193 A1 Dec. 1, 2022

Related U.S. Application Data

(63) Continuation of application No. 16/829,679, filed on Mar. 25, 2020, now Pat. No. 11,428,181.

(51) Int. Cl.
*F02D 41/06* (2006.01)
*F01N 11/00* (2006.01)

(52) U.S. Cl.
CPC .......... *F02D 41/068* (2013.01); *F01N 11/005* (2013.01); *F01N 11/007* (2013.01)

(58) Field of Classification Search
CPC .............. F02D 41/068; F02D 41/0007; F02D 41/0055; F02D 41/22; F02D 41/345; F02D 41/064; F01N 11/005; F01N 11/007; F01N 3/2006; F01N 2340/06; F01N 2900/08; F01N 2900/1404; F01N 2900/1411; F01N 2900/1602; F01N 2900/1626; F01N 3/208; F01N 9/00; Y02T 10/12; Y02T 10/40
See application file for complete search history.

(56) References Cited

U.S. PATENT DOCUMENTS

| | | | |
|---|---|---|---|
| 3,751,914 A | 8/1973 | Pollock |
| 3,812,324 A | 5/1974 | Faffaelli |
| 3,838,569 A | 10/1974 | Reck |
| 4,141,213 A | 2/1979 | Ross |
| 4,502,278 A | 3/1985 | Stark |

(Continued)

FOREIGN PATENT DOCUMENTS

| | | |
|---|---|---|
| DE | 10016219 A1 | 2/2002 |
| DE | 10 2010 008 472 A1 | 12/2010 |

(Continued)

OTHER PUBLICATIONS

German Office Action from DE App. No. 102021107175.5 dated Jan. 3, 2023, with English translation, 17 pages.

*Primary Examiner* — Joseph J Dallo
(74) *Attorney, Agent, or Firm* — FOLEY & LARDNER LLP

(57) ABSTRACT

Systems and apparatuses include an engine, an aftertreatment system including a catalyst, and a controller coupled to the aftertreatment system and the engine. During a warmup period for an engine, the controller determines a value regarding a mass flow rate of exhaust gas based on information received from at least one of the engine or the aftertreatment system. The controller receives a target value regarding the mass flow rate of the exhaust gas. The controller controls at least one of the engine, the aftertreatment system, or at least one component associated therewith to reach or attempt to reach the target value regarding the mass flow rate of the exhaust gas.

20 Claims, 4 Drawing Sheets

(56) References Cited

U.S. PATENT DOCUMENTS

| | | |
|---|---|---|
| 4,505,107 A | 3/1985 | Yamaguchi et al. |
| RE31,908 E | 6/1985 | Petrik et al. |
| 5,253,475 A | 10/1993 | Kabasin |
| 5,342,591 A | 8/1994 | Pfefferle |
| 5,380,506 A | 1/1995 | Taylor, Jr. |
| 5,410,872 A | 5/1995 | Adamczyk et al. |
| 5,419,123 A | 5/1995 | Masters |
| 5,425,233 A | 6/1995 | Ma et al. |
| 5,457,957 A | 10/1995 | Hartel et al. |
| 5,551,231 A | 9/1996 | Tanaka et al. |
| 5,603,216 A | 2/1997 | Guile et al. |
| 5,609,021 A | 3/1997 | Ma |
| 5,613,360 A | 3/1997 | Iwai et al. |
| 5,685,144 A | 11/1997 | Ma |
| 5,720,609 A | 2/1998 | Pfefferle |
| 5,738,074 A | 4/1998 | Nakamura et al. |
| 5,746,049 A | 5/1998 | Cullen et al. |
| 5,791,308 A | 8/1998 | Carter et al. |
| 5,802,844 A | 9/1998 | Lee et al. |
| 5,814,283 A | 9/1998 | Matuoka et al. |
| 6,023,929 A | 2/2000 | Ma |
| 6,029,441 A | 2/2000 | Mizuno et al. |
| 6,089,015 A | 7/2000 | Strehlau et al. |
| 6,209,313 B1 | 4/2001 | Wissler et al. |
| 6,293,094 B1 | 9/2001 | Schmidt et al. |
| 6,325,054 B1 | 12/2001 | Wenger et al. |
| 6,523,342 B2 | 2/2003 | Kuper et al. |
| 6,684,632 B2 | 2/2004 | Huynh et al. |
| 6,934,622 B2 | 8/2005 | Sisken |
| 7,367,179 B2 | 5/2008 | Frank et al. |
| 7,448,204 B2 | 11/2008 | Nishimura et al. |
| 7,448,462 B2 | 11/2008 | Etou |
| 8,364,376 B2 | 1/2013 | Wang et al. |
| 8,498,798 B2 | 7/2013 | Koch et al. |
| 9,206,756 B2 | 12/2015 | Zhu et al. |
| 9,506,414 B2 | 11/2016 | Melby et al. |
| 2002/0023429 A1 | 2/2002 | Kuper et al. |
| 2002/0023434 A1 | 2/2002 | Huynh et al. |
| 2005/0103000 A1* | 5/2005 | Nieuwstadt ............ F02D 41/222 60/301 |
| 2010/0122523 A1* | 5/2010 | Vosz ...................... F01N 3/208 60/285 |
| 2013/0047607 A1 | 2/2013 | Petrovic |
| 2014/0134054 A1 | 5/2014 | Yezerets et al. |
| 2015/0033837 A1* | 2/2015 | Niemeyer ............ F01N 11/002 73/114.75 |
| 2020/0370454 A1* | 11/2020 | Gupta ................ F01N 13/0093 |
| 2021/0301742 A1* | 9/2021 | Shaver .................. F02D 31/001 |

FOREIGN PATENT DOCUMENTS

| | | | |
|---|---|---|---|
| WO | WO-2009112056 A1 * | 9/2009 | ............ F01N 9/005 |
| WO | WO-2010089038 A1 * | 8/2010 | ........... F02D 41/024 |

* cited by examiner

SYSTEMS AND METHODS FOR ULTRA-LOW NOX COLD START WARMUP CONTROL AND FAULT DIAGNOSIS

CROSS-REFERENCE TO RELATED APPLICATION

This application is a continuation of U.S. patent application Ser. No. 16/829,679, filed Mar. 25, 2020, titled "SYSTEMS AND METHODS FOR ULTRA-LOW NOx COLD START WARMUP CONTROL AND FAULT DIAGNOSIS," which is incorporated herein by reference in its entirety.

TECHNICAL FIELD

The present disclosure relates generally to a system for balancing emissions regulations with operating needs.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Consequently, the use of exhaust aftertreatment systems on engines to reduce emissions is increasing. A common component in many of these exhaust aftertreatment systems is a selective catalytic reduction (SCR) system, which reduces a quantity of nitrous oxide (NOx) present in the exhaust gas by injecting a reductant into the flow of exhaust combined with the exhaust gas interacting with a catalyst. The catalyst reacts with the exhaust gas to form harmless nitrogen and water.

SUMMARY

One embodiment relates to a system that includes an aftertreatment system including a catalyst, and a controller coupled to the aftertreatment system. During a warmup period for an engine coupled to the catalyst, the controller is configured to determine a value of a catalyst heating metric indicative of an amount of emissions produced per unit of exhaust energy based on information received from the engine and the aftertreatment system, and control at least one of a turbocharger, a fuel injection system, or an Exhaust Gas Recirculation (EGR) system to reach a target value of the catalyst heating metric.

Another embodiment relates to a system that includes an aftertreatment system including a catalyst, and a controller coupled to the aftertreatment system. During a warmup period for an engine coupled to the catalyst, the controller is configured to determine a value of an catalyst heating metric indicative of an amount of emissions produced per unit of exhaust energy based on information received from the engine and the aftertreatment system, determine a reference value based on information regarding a current status of the engine and the aftertreatment system, compare the value of the catalyst heating metric to the reference value, and diagnose a malfunction in the aftertreatment system in response to determining that the catalyst heating metric exceeds the reference value.

Another embodiment relates to a method for balancing emissions from an engine and heating a catalyst in an aftertreatment system. The method includes, during a warmup period for the engine, determining a value of a catalyst heating metric indicative of an amount of emissions produced per unit of exhaust energy based on information received from the engine and the aftertreatment system, and controlling at least one of a turbocharger, a fuel injection system, or an Exhaust Gas Recirculation (EGR) system to affect combustion within the engine in order to reach a target value of the catalyst heating metric.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
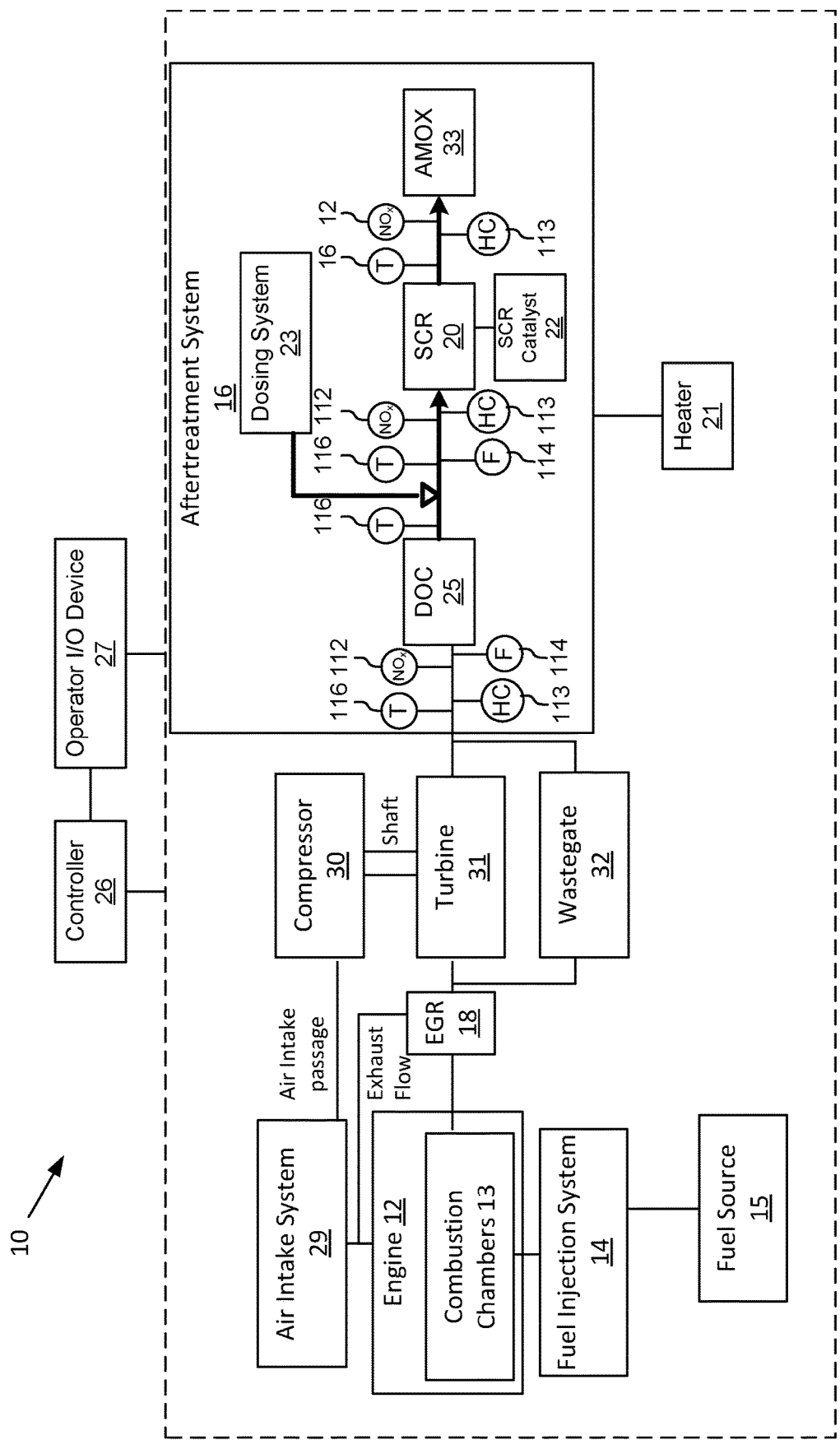
FIG. 1 is a schematic diagram of a system with a controller, as shown in an exemplary embodiment.

Following below are more detailed descriptions of various concepts related to, and implementations of, methods and systems for controlling and diagnosing an ultra-low NOx system. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the Figures generally, the various embodiments disclosed herein relate to systems, apparatuses, and methods for controlling emissions during a cold-started engine's warmup period and diagnosing the health of one or more exhaust aftertreatment system components. A key component in aftertreatment systems of many modern engines is a Selective Catalytic Reduction (SCR) system that utilizes a two-step process to greatly reduce harmful NOx emissions present in exhaust gas. First, a doser injects a reductant into the exhaust stream. This reductant may be a urea, diesel exhaust fluid (DEF), Adblue®, a urea water solution (UWS), an aqueous urea solution (e.g., AUS32, etc.), or another similar fluid that chemically binds to particles in the exhaust gas. Then, this mixture is run through an SCR catalyst that, when at a certain temperature, causes a reaction in the mixture that converts the harmful NOx particles into pure nitrogen and water. However, if the catalyst is not at the proper temperature, this conversion will not happen or will happen at a lower efficiency. Therefore, maintaining the catalyst temperature at a desired temperature or temperature range is impactful on the conversion efficiency of the catalyst.

Heating the catalyst from a cold soak (or cold start) presents some difficulty. A common method of heating the SCR catalyst is to provide exhaust energy from the engine's hot exhaust gas. However, in those situations in which the engine is starting from a cold soak, the SCR catalyst is not yet at the desired temperature, so the hot exhaust gas being provided from the engine is not being properly treated or reduced. As such, harmful NOx and hydrocarbon gases are being released into the atmosphere at possibly unacceptable levels. In other words, trying to produce hot exhaust gas to heat the catalyst when the catalyst is not at a desired operating temperature may lead to the catalyst not reducing the harmful components in the exhaust gas during this warmup period. Therefore, it is important to balance heating the SCR catalyst while keeping NOx and other regulated emissions low. It is important that the catalyst reaches the operating temperature from a cold condition in a time span that is consistent with the rate of production of noxious emissions from the engine. A high rate of engine emissions during the warm-up period dictates that the catalyst warms up quickly. A low emissions rate may allow the catalyst to warm up more slowly.

As shown in FIG. 1, a system 10 comprising an engine 12, an aftertreatment system 16 coupled to the engine 12, a controller 26, and an operator input/output (I/O) device 27 is shown, according to an example embodiment. The system 10 may mitigate high NOx and other regulated emissions during a warmup period for the engine and catalyst of the aftertreatment system. The engine 12 may be any type of engine that generates exhaust gas, such as an internal combustion engine (e.g., compression ignition or a spark ignition engine that may utilize various fuels, such as natural gas, gasoline, diesel fuel, etc.), a hybrid engine (e.g., a combination of an internal combustion engine and an electric motor), or any other suitable engine. The engine 12 includes one or more cylinders and associated pistons. In this regard, air from the atmosphere is combined with fuel, and combusted, to power the engine 12. Combustion of the fuel and air in combustion chambers 13 of the engine 12 produces exhaust gas that is operatively vented to an exhaust pipe and to the aftertreatment system 16. In this exemplary embodiment, the system 10 is implemented with an on-road or an off-road vehicle including, but not limited to, line-haul trucks, mid-range trucks (e.g., pick-up truck, etc.), sedans, coupes, tanks, airplanes, boats, and any other type of vehicle. In other embodiments, the system may be implemented with stationary pieces of equipment like power generators or gen-sets.

In the example shown, the engine 12 is structured as an internal combustion engine and particularly, a compression-ignition engine. The system 10 is also shown to include an air intake system 29 structured to throttle a flow of air into the combustion chambers 13 of the engine 12, and a fuel injection system 14 structured to receive fuel from a fuel source 15 and inject fuel into the combustion chambers 13 of the engine 12. In one embodiment and as shown, the fuel injection system 14 delivers the fuel to the engine 12 via a common rail. In these embodiments, the pressure of the common rail can be managed in order to affect the atomization of the fuel as the fuel is injected. Greater common rail pressure begets greater fuel atomization, which, in turn, improves the combustion efficiency of the fuel and reduces the production of NOx. In some embodiments, the fuel injection system 14 may utilize a multiple injection cycle such that a main injection of fuel for combustion is followed by another, smaller injection of fuel. Injections following the main injection for combustion are known as post-injections.

Post injection refers to fuel that is injected after the combustion stroke—i.e., fuel injected that is not used for combustion. By altering the quantities and timings of the multiple injection cycle, the amount of NOx being produced by the engine 12 can be controlled. For example, retarding fuel injection timing in the fuel injection system 14 can decrease the NOx output from the engine 12.

The air intake system 29 is coupled to an EGR system 18 that includes an EGR valve that directs a portion of the exhaust gas from the engine 12 back towards the engine 12 rather than allowing that exhaust gas to pass through the aftertreatment system 16 and into the atmosphere. By mixing the exhaust gas with the intake air in the combustion chambers 13 of the engine 12, thermal characteristics of the combustion charge are altered such that in certain situations lower NOx or other undesired emission products is produced. Operation of the EGR system 18 also affects exhaust energy output from the system 10. In this regard, increasing the EGR amount may function displace some intake air for the engine thereby reducing the amount of fuel injected into the engine for, e.g., stoichiometric conditions. As a result, the power output from the engine may decrease. Additionally, more EGR may result in higher particulate matter emissions. However, additional EGR amounts may lead to a reduction in some emission types, such as NOx, due to EGR tending to lower combustion temperatures. Therefore, manipulating the EGR amount can affect emission characteristics as well as power output.

As also shown in FIG. 1, the system 10 includes a turbocharger that is shown as a combination of a compressor 30 and a turbine 31. Exhaust gas of the combustion is discharged to the turbine 31, which is mechanically coupled to the compressor 30 through, for example, a shaft, and drives the compressor 30. A wastegate 32 can enable part of the exhaust gas to bypass the turbine 31, resulting in less power transfer to the compressor 30. A combination of bypass and turbine flow enters the aftertreatment system 16 for aftertreatment before being released to the atmosphere. In one embodiment, the system 10 may include a Variable Geometry Turbine (VGT) instead of the wastegate 32. The VGT is structured to flexibly modulate the power transferred to the turbine 31 by changing a position of a valve of the VGT. The compressor 30 may compress air before the air is aspirated into the air intake system 29 through an air intake passage, thereby increasing the temperature and pressure of the air flow. The system 10 may also include a charge air cooler that is positioned downstream of the compressor 30 and is structured to reduce the temperature and increase a density of the intake air, thereby improving efficiency by reducing loss due to the increase in temperature of the air from compression. Operation of the turbocharger also affects exhaust energy output from the system 10. In some embodiments, the air intake system 29 includes an air intake manifold, an air intake throttle, and/or an air intake valve structured to control access of the air to the combustion chambers 13.

As the exhaust gas drives the turbine 31 to rotate, the compressor 30 compresses the air supplied to the combustion chambers 13 of the engine 12. The wastegate 32, by diverting some exhaust gas from the turbine 31, reduces the power transferred to the compressor 30, thereby reducing the rate at which the air flow is supplied to the combustion chambers 13 of the engine 12. Conversely, if the wastegate 32 is closed, all or mostly all of the exhaust gas is directed to the turbine 31, increasing the amount of power transferred to the compressor 30 and increasing the rate of air flow into the combustion chambers 13 of the engine. In one embodiment in which the wastegate 32 is replaced by the VGT, the VGT may change the turbine power by controlling the vane position in the VGT. The VGT allows the system to achieve an optimum aspect ratio. If the aspect ratio is large (i.e. more opened) the power transferred by the turbine 31 to the compressor 30 is low, thus reducing an achievability of a high boost pressure (e.g. at idle). Conversely, if the aspect ratio is small (i.e. less opened), the power transferred by the turbine 31 to the compressor 30 is high, and thereby the compressor can supply more air to the combustion chamber through the air intake system 29. Altering operation of the turbocharger can affect combustion efficiency. For example, increasing the air flow (i.e. a smaller aspect ratio) increases the air content of the air-fuel mixture in the combustion chambers 13, which increases a combustion efficiency of the mixture. Combustion efficiency refers to how much energy is being extracted from a given amount of provided fuel. One-hundred percent combustion efficiency indicates that all of the energy in the amount of fuel has been extracted into useful work. This level of combustion efficiency is practically not obtainable given the dynamics of an engine system and the losses associated therewith. Together with operation of the turbocharger, operation of the EGR system 18 can affect combustion stability and emissions from the engine (e.g., NOx, HC, PM, etc.). High fractions of air in the air intake system 29 caused by high compressor 30 power (i.e. a "leaner" combustion) may enhance combustion stability, thereby reducing PM and HC emissions. However, such leaner combustion may lead to high combustion temperatures, thereby producing more NOx. Optimal operation of the turbocharger and EGR system 18 can allow the engine 12 to achieve optimal combustion efficiency while minimizing emissions through changing conditions A combination of bypass flow and turbine flow may enter the aftertreatment system 16. The aftertreatment system 16 is shown to include an SCR system 20, and a heater 21.

The SCR system 20 is structured to receive exhaust gas in a decomposition chamber 24 (e.g. reactor, reactor pipe, etc.), in which the exhaust gas is combined with a reductant, which may be, for example, urea, diesel exhaust fluid (DEF), Adblue®, a urea water solution (UWS), an aqueous urea solution (e.g., AUS32, etc.), or other similar fluids. An amount of reductant is metered by a dosing system 23. The decomposition chamber 24 includes an inlet in fluid communication with the EGR system 18 to receive the exhaust gas containing NOx emissions and an outlet for the exhaust gas-reductant mixture to flow to a SCR catalyst 22. The SCR catalyst 22 is configured to assist in the reduction of NOx emissions by accelerating a NOx reduction process between the reductant and the NOx of the exhaust gas into diatomic nitrogen, water, and/or carbon dioxide. The SCR catalyst 22 may be made from a combination of an inactive material and an active catalyst, such that the inactive material, (e.g. ceramic metal) directs the exhaust gas towards the active catalyst, which is any sort of material suitable for catalytic reduction (e.g. base metals oxides like vanadium, molybdenum, tungsten, etc. or noble metals like platinum). If the SCR catalyst 22 is not at or above a certain temperature, the rate of the NOx reduction process is limited and the SCR system 20 will not operate at a desired level of efficiency to meet various regulations. In some embodiments, this certain temperature is a temperature range corresponding to 250-300° C. In other embodiments, the certain operating temperature corresponds with the conversion efficiency of the SCR catalyst 22 meeting or exceeding a pre-defined conversion efficiency threshold for the SCR. Other catalyst elements in the system such as a DOC or AMOX may also desired increased temperature levels to achieve desired operating efficiencies (e.g., NOx reduction or other emissions type) and, in turn, have their own certain desired operating temperature thresholds or ranges.

The efficiency of the NOx reduction process is also affected by the amount of reductant injected into the decomposition chamber 24 by the dosing system 23. Generally, the more reductant that is present in the resultant exhaust gas-reductant mixture, the more of the NOx in the exhaust gas that is reduced. Although there is a point at which too much reductant in the mixture can lead to a separate set of problems (e.g. ammonia slip). The general principle is that increasing the amount of reductant injected by the dosing system 23 improves the reductive capabilities of the SCR system 20, thereby reducing the amount of NOx and other regulated emissions released into the atmosphere. In some embodiments, the aftertreatment system 16 includes an ammonia oxidation catalyst (AMOX) 27 that is structured to address ammonia slip by removing excess ammonia from the treated exhaust gas before the treated exhaust is released into the atmosphere.

The heater 21 is a heating element structured to output heat in order to increase the temperature of the exhaust gas. The heater 21 may have any of various designs (e.g., a resistive coil heater like shown or another type of heater). The heater 21 may be a convective heater to heat the exhaust gas passing through it or to heat the catalyst directly, for example. Accordingly, the heater 21 may be powered by a battery or alternator (or another electronic source, such as a capacitor) of the system 10. Heating the exhaust gas increases efficiency and the success of the SCR catalyst 22 in cold situations (e.g., ambient temperatures at or below the freezing temperature of water). The heater 21 is controlled by the controller 26 to turn the heater 21 on or off as further described below. When the heater 21 is "on" or "activated," the heater 21 outputs heat, and when the heater 21 is "off" or "deactivated," the heater 106 ceases heat output.

In some embodiments, the aftertreatment system 16 further includes a diesel oxidation catalyst (DOC) 25 that is structured to receive a flow of exhaust gas and to oxidize hydrocarbons and carbon monoxide in the exhaust gas. In some embodiments and depending on the system architecture, the aftertreatment system 16 may further include a three-way catalyst (not shown) that is structured to receive a flow of exhaust gas and to reduce NOx into nitrogen and water and to oxidize hydrocarbons and carbon monoxide in the exhaust gas (i.e. perform the combined functions of the SCR catalyst 22 and of the DOC 25).

Figure 2:
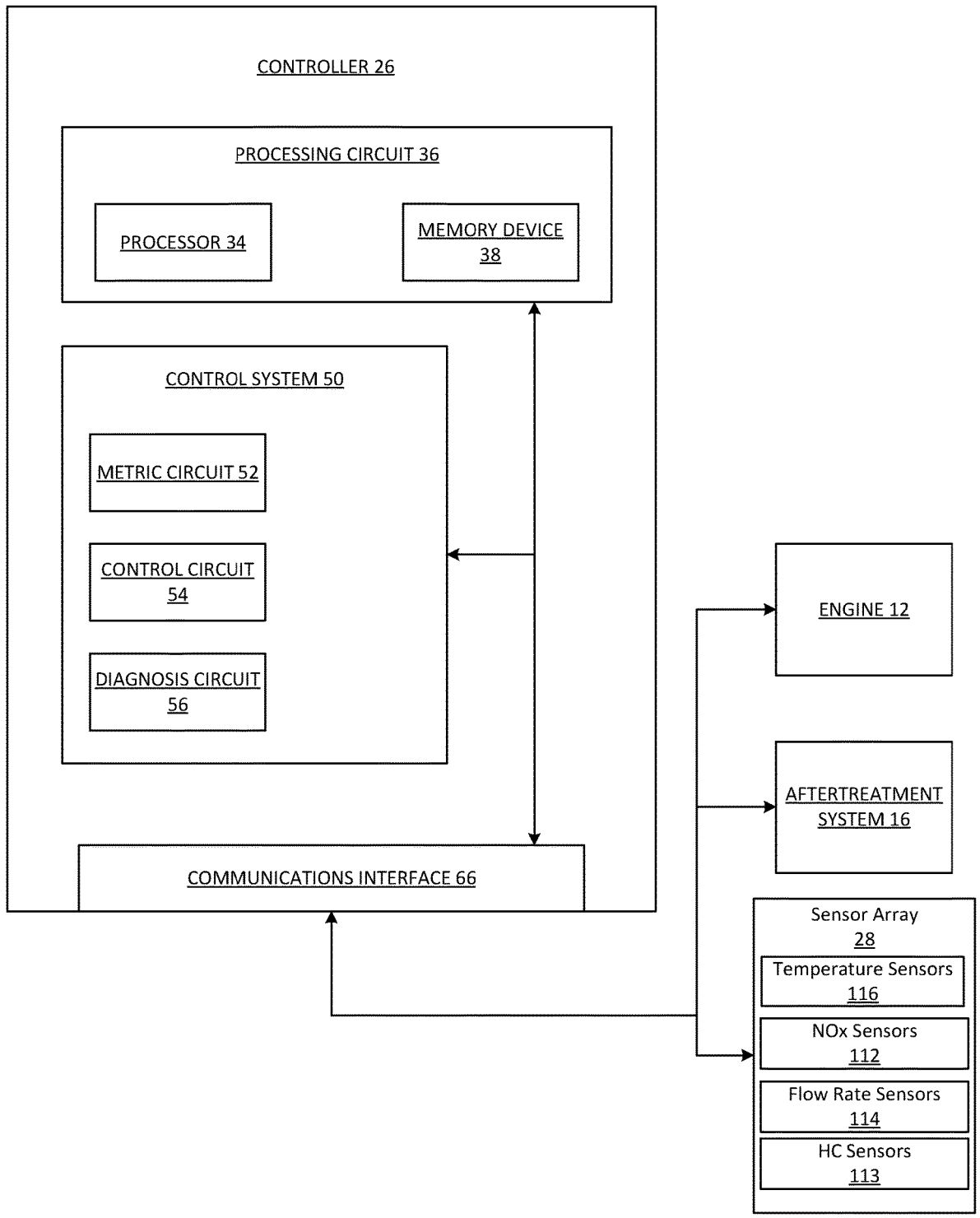
FIG. 2 is a schematic diagram of the controller of the system of FIG. 1, according to an exemplary embodiment.

Briefly referencing FIG. 2, as also shown, a sensor array 28 is included in the aftertreatment system 16. The sensors are coupled to the controller 26, such that the controller 26 can monitor and acquire data indicative of operation of the system 10. In this regard, the system 10 includes NOx sensors 112, HC sensors 113, flow rate sensors 114, temperature sensors 116. The NOx sensors 112 acquire data indicative of or, if virtual, determine a NOx amount at or approximately at their disposed location. The HC sensors 113 acquire data indicative of or, if virtual, determine a HC amount at or approximately at their disposed location. The flow rate sensors 114 acquire data indicative of or, if virtual, determine an approximate flow rate of the exhaust gas at or approximately at their disposed location. The temperature sensors 116 acquire data indicative of or, if virtual, determine an approximate temperature of the exhaust gas at or approximately at their disposed location. It should be understood that the depicted locations, numbers, and type of sensors is illustrative only. In other embodiments, the sensors may be positioned in other locations, there may be more or less sensors than shown, and/or different/additional sensors may also be included with the system 10 (e.g., a pressure sensor, etc.). Those of ordinary skill in the art will appreciate and recognize the high configurability of the sensors in the system 10.

The controller 26 is coupled to the engine 12 and the system 10, and is structured to at least partly control the system 10 and, in some embodiments, the engine 12. When the sensors are structured as real sensors, the controller 26 receives signals from the sensor array 28 indicative of the performance of components of the system 10 and uses the signals received to analyze the status of the system 10 and perform various operations or actions in response to these signals. The controller 26 also receives signals from the engine 12 regarding performance and operation of the engine 12.

The sensor array 28 is structured to acquire and/or generate data indicative of various operating parameters of the system 10. The controller 26 can receive the data from the sensor array 28, process the data to create corresponding commands, and send the commands to components of the system 10. As shown, the sensor array 28 includes NOx sensors 112, HC sensors 113, flow rate sensors 114, and temperature sensors 116. The sensor array 28 may also include engine sensors and fuel-injection sensors that, similar to the sensors 112, 113, 114, and 116, may be real or virtual, may be numerous or only one of each, and may be disposed in one or more locations with the system 10. The engine sensor is coupled to the engine 12 to receive signals indicative of performance of the engine 12, including torque, speed, power, transient response, and noise. The fuel-injection sensor is coupled to the fuel injection system 14 to receive signals indicative of a pressure of the common rail, fueling quantity of the main injection, fueling quantity of the post-injection, and/or injection timing(s).

It should be understood that a variety of other sensors may also be included with the system 10. For example, engine speed, torque, and temperature sensors may be coupled to the engine 12. As another example, fuel pressure, temperature, and flow rate sensors may be coupled to the fuel injection system 14 and fuel source 15. As still another example, a mass air flow sensor may be coupled to the air intake system 29 to acquire data indicative of the mass air flow into the engine 12. These sensors may be coupled to the controller 26.

The controller 26 is structured to control the system 10 in order to reach a target value of a catalyst heating metric which is indicative of the EONOx per unit of exhaust energy generated by the engine 12. This catalyst heating metric balances heating up a catalyst, which is shown as the SCR catalyst 22 heating metric, to a desired pre-determined operating efficiency using exhaust energy while keeping NOx (or another emissions type, such as PM or HC) emissions low during, for example, a warm up period when the catalyst is not operating at a desired efficiency such that NOx (or the other emissions type) may be or could be emitted at higher quantities than desired. In other embodiments and as described herein, the heating metric value may be determined for other catalysts in the system, such as the DOC 25, AMOX 33, or a three-way catalyst. In these instances, the values used in the formulas below are adjusted to correlate with the particular catalyst (e.g., DOC).

In an exemplary embodiment, the controller 26 is configured to perform this operation during a warmup period for the system 10, which in one embodiment is defined as a period of time from a start of the engine 12 from a cold soak to a period where the SCR catalyst 22 conversion exceeds a predefined operating efficiency. The cold soak (or cold start) refers to the engine 12 sitting for a period of time such that a temperature of the engine 12 is substantially equal to that of the outside or ambient outside temperature. Thus, in very cold situations (e.g., below the freezing temperature of water), the engine 12, and therefore the SCR catalyst, are similarly cold, which means increasing the temperature to help promote efficiency is especially important to the operational ability of the SCR catalyst 22 in the system 10. As such, the cold soak can be defined as a time in which the SCR catalyst 22 is below a pre-defined operating efficiency or another threshold. Alternatively, if the ambient temperature is very hot (e.g. 30° C. or greater) and if the engine 12 had previously been running for an extended period and only keyed off for a brief period, the SCR catalyst 22 may already be near or at the predefined operating efficiency, thereby reducing or eliminating the warmup period.

In one embodiment, the predefined operating efficiency of the SCR catalyst 22 is a NOx conversion efficiency for the SCR system 20, and the time period is the time from engine 12 start to the NOx conversion efficiency being at or above a predefined NOx conversion efficiency threshold. In another embodiment, the predefined operating efficiency is based on a temperature of the SCR catalyst 22 such that the time period is the time from engine 12 start to when the temperature of the SCR catalyst 22 or another component of the SCR system 20 is at or above a predefined temperature or within a predefined temperature range. In this regard, at higher temperatures, the controller 26 determines that a desired operating performance value of the SCR system 20 is achieved or likely achieved (i.e. higher temperatures promote catalyst activity such that temperature may be a proxy for SCR system 20 performance). In still another embodiment, the predefined operating efficiency or temperature is based on at least one of a drive cycle of the engine, a load on the engine, and an age of the SCR catalyst 22.

In other embodiments and regarding the aforementioned other predefined threshold, this warmup period is defined as the time from engine 12 start to the SCR catalyst 22 reaching a predefined temperature threshold. In another embodiment, the warmup period is defined as the time from engine 12 start to EONOx being at or below a predefined threshold. This predefined threshold may be based on a sensed temperature of the SCR catalyst 22, on an amount of EONOx, etc. For example, if an ambient temperature for the vehicle housing the system is high (e.g. 30° C. or more), the SCR catalyst 22 may be at or near operating efficiency at the start of the engine 12, so the warmup period would be short or non-existent.

With the above in mind and based on the foregoing, in one embodiment, the value of the catalyst, which is used to determine the catalyst heating metric in this example, is obtained by formula (1):

$$\text{Metric} = \frac{\overline{M}_{EOE}}{\overline{H}_{Exh}} \quad (1)$$

where $\overline{M}_{EOE}$ is the cumulative mass of emissions produced over a period of time, and is calculated or determined as:

$$\overline{M}_{EOE} = \left(\frac{1}{t^*}\right)\int_0^{t^*} \dot{m}_{EOE} dt$$

where t* is the time at which the catalyst is at the certain operating temperature or conversion efficiency and $\dot{m}_{EOE}$ is the mass flow rate of a particular engine out emissions given by:

$$\dot{m}_{EOE} = K * EOE * \dot{m}_{Exh}$$

where K is a physical constant, EOE is the engine out emissions amount, and $\dot{m}_{Exh}$ is the mass flow rate of the exhaust gas leaving the engine 12. $\overline{H}_{Exh}$ is the cumulative energy produced over a period of time, and is calculated as:

$$\overline{H}_{Exh} = \left(\frac{1}{t^*}\right) \int_0^{t^*} \dot{h}_{Exh} dt$$

where $\dot{h}_{Exh}$ is the energy flow rate of the exhaust gas entering the catalyst and is given by:

$$\dot{h}_{Exh} = \dot{m}_{Exh} * C_p * T_{Exh}$$

where $C_p$ is a constant denoting the heat capacity of exhaust at a certain pressure and $T_{Exh}$ is the temperature of the exhaust entering the catalyst. The Exhaust Temperature may also be referenced to another temperature such as a standard temperature (e.g. 0° C.) or a temperature of the catalyst.

$$T_{Exh} = T_{Gas} - T_0$$

or $$T_{Exh} = T_{Gas} - T_{SCR}$$

As such, formula (1) can be re-written as:

$$\text{Metric} = \frac{\int_0^{t^*} K * EOE * \dot{m}_{Exh} dt}{\int_0^{t^*} \dot{m}_{Exh} * C_p * T_{Exh} dt}$$

It is to be noted that Formula 1 can be applied to the SCR catalyst 22, the DOC, the three-way catalyst, or the AMOX. As such, Formula 1 and the associated formulas may be rearranged to identify emissions, such as NOx (for the SCR catalyst 22), hydrocarbons (for the DOC), ammonia (for the AMOX), Non-methane organic gases NMOG, or any emissions treated by a catalyst in the aftertreatment system 16. For example, formula (1) can be written as:

$$\text{Metric} = \frac{\int_0^{t^*} K * EONOx * \dot{m}_{Exh} dt}{\int_0^{t^*} \dot{m}_{Exh} * C_p * T_{Exh} dt}$$

where EOE has been replaced with EONOx. Another example is shown below:

$$\frac{\int_0^{t^*} K * EOHC * \dot{m}_{Exh} dt}{\int_0^{t^*} \dot{m}_{Exh} * C_p * TExh dt}$$

where EOHC is the engine out hydrocarbons amount and has replaced the EOE term. Using the sensors in FIG. 1, the metric may be changed to associate with different emission types (e.g., NOx, HC, PM, SOx, etc.) for different catalysts of the aftertreatment system.

The controller 26 is configured to diagnose a health of the system 10 based on a comparison of the catalyst heating metric from formula (1) with a pre-defined reference value. The health of the system 10 may refer to a health of the system 10 as a whole or a component in the system 10, such as the aftertreatment system 16, the engine 12, the SCR system 20, the EGR system 18, etc. In an exemplary embodiment, the controller 26 is configured to perform this diagnosis during the warmup period for the system 10, which is defined as the period of time from the start of the engine 12 from a cold soak to a period where the SCR catalyst 22 conversion exceeds a predefined threshold. This predefined threshold may be based on a sensed temperature of the SCR catalyst 22, on an amount of EONOx, or on any other factor indicative of conversion efficiency.

The predefined reference value is a predefined acceptable value for the catalyst heating metric (e.g., SCR heating metric) and may be modified based on the engine 12 drive cycle, engine 12 speed, engine 12 load (either an instantaneous value or expected trajectory), age of components of the system 10, operating hours of the system 10, and/or the amount of time spent above a particular temperature for the SCR catalyst 22. For example, if the SCR catalyst 22 has spent a great deal of time (e.g., more than a predefined value, such as 30 minutes, 1 hour, etc.) above a particular temperature, the pre-defined reference value is increased to account for the fact that the SCR catalyst 22 is less responsive to exhaust energy so more exhaust (and therefore more EONOx) is generated in order to generate the desired exhaust energy. This may be due to the SCR catalyst being old (e.g., based on an hours of use threshold, a time since last regeneration threshold, a number of regeneration threshold, etc.). The reference value may also be determined based on telematics data received by the controller 26 (e.g. via the communications interface 66) regarding the current status of the vehicle in which the engine 12 is operating. For example, if the telematics data indicates that the vehicle is approaching a driving section with rainy conditions, the reference value is increased in order to compensate for the cooling effect of rain that would require more EONOx to be generated in order to warm the SCR catalyst 22.

If the catalyst heating metric from formula (1) is less than or equal to the reference value, the controller 26 determines that the system 10 is working as well as or better than expected, so the controller 26 takes no action. If the catalyst heating metric from formula (1) is greater than the reference value, then the controller 26 determines that the system 10 is malfunctioning because the system 10 is producing more EONOx per unit of exhaust energy than is expected. In response to a determination that the system 10 is malfunctioning, the controller 26 is configured to take at least one of a set of corrective actions. These corrective actions include, but are not limited to, activating auxiliary emissions control features present in the engine 12, such as a heater 21 coupled to the SCR catalyst 22 that can increase the temperature of the SCR catalyst 22 without generating NOx. The controller 26 may also reduce a power output of the engine 12 (i.e. de-rate the engine 12), which would reduce the amount of NOx emissions but would similarly reduce the heating exhaust energy supplied to the SCR catalyst 22, thereby prolonging the warmup period. The controller 26 is further configured to notify a user of the system 10 malfunction. This notification may take the form of an illuminated lamp on a dashboard of the vehicle, triggering of one or more fault codes, and/or as an error message appearing on a Graphical User Interface (GUI) displayed on the vehicle.

As the components of FIG. 1 are shown to be embodied in the system 10, the controller 26 may be structured as one or more electronic control units (ECU). The function and structure of the controller 26 is described in greater detail in FIG. 2. The operator I/O device 27 may enable an operator of the vehicle (or passenger or manufacturing, service, or maintenance personnel) to communicate with the vehicle and the controller 26. By way of example, the operator I/O device 27 may include, but is not limited to, an interactive display, a touchscreen device, one or more buttons and switches, voice command receivers, and the like. For example, information relating to the data/information acquired by the controller 26 or operations/commands provided by the controller 26 to control or manage one or more components (e.g., engine 12) may be provided to an operator or user via the operator I/O device 27.

Referring now to FIG. 2, a schematic diagram of the controller 26 of the system 10 of FIG. 1 is shown according to an example embodiment. As shown in FIG. 2, the controller 26 includes a processing circuit 36 having a processor 34 and a memory device 38, a control system 50 having a metric circuit 52, a control circuit 54, and a diagnosis circuit 56, and a communications interface 66. Generally, the controller 26 is structured to determine a metric that captures the balance between heating the SCR catalyst 22 and keeping NOx emissions low, to control the engine 12 and other related components in order to reach a target value for the metric, and to diagnose a malfunction of the system 10 based on an analysis of the metric.

In one configuration, the metric circuit 52, the control circuit 54, and the diagnosis circuit 56 are embodied as machine or computer-readable media that is executable by a processor, such as processor 34. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the metric circuit 52, the control circuit 54, and the diagnosis circuit 56 are embodied as hardware units, such as electronic control units. As such, the metric circuit 52, the control circuit 54, and the diagnosis circuit 56 may be embodied as one or more circuitry components including, but not limited to, processing circuitry, network interfaces, peripheral devices, input devices, output devices, sensors, etc. In some embodiments, the metric circuit 52, the control circuit 54, and the diagnosis circuit 56 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the metric circuit 52, the control circuit 54, and the diagnosis circuit 56 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The metric circuit 52, the control circuit 54, and the diagnosis circuit 56 may also include programmable hardware devices such as field programmable gate arrays, programmable array logic, programmable logic devices or the like. The metric circuit 52, the control circuit 54, and the diagnosis circuit 56 may include one or more memory devices for storing instructions that are executable by the processor(s) of the metric circuit 52, the control circuit 54, and the diagnosis circuit 56 The one or more memory devices and processor(s) may have the same definition as provided below with respect to the memory device 38 and processor 34 In some hardware unit configurations, the metric circuit 52, the control circuit 54, and the diagnosis circuit 56 may be geographically dispersed throughout separate locations in the vehicle. Alternatively and as shown, the metric circuit 52, the control circuit 54, and the diagnosis circuit 56 may be embodied in or within a single unit/housing, which is shown as the controller 26.

In the example shown, the controller 26 includes the processing circuit 36 having the processor 34 and the memory device 38. The processing circuit 36 may be structured or configured to execute or implement the instructions, commands, and/or control processes described herein with respect to metric circuit 52, the control circuit 54, and the diagnosis circuit 56. The depicted configuration represents the metric circuit 52, the control circuit 54, and the diagnosis circuit 56 as machine or computer-readable media. However, as mentioned above, this illustration is not meant to be limiting as the present disclosure contemplates other embodiments where the metric circuit 52, the control circuit 54, and the diagnosis circuit 56, or at least one circuit of the metric circuit 52, the control circuit 54, and the diagnosis circuit 56, is configured as a hardware unit. All such combinations and variations are intended to fall within the scope of the present disclosure.

The processor 34 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., metric circuit 52, the control circuit 54, and the diagnosis circuit 56 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 38 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 38 may be communicably connected to the processor 34 to provide computer code or instructions to the processor 34 for executing at least some of the processes described herein. Moreover, the memory device 38 may be or include tangible, non-transient volatile memory or non-volatile memory. Accordingly, the memory device 38 may include database components, object code components, script components, or any other type of information structure for supporting the various activities and information structures described herein.

The metric circuit 52 is configured to receive information from the sensor array 28 and determine the catalyst heating metric for the system 10. This information includes the various inputs for calculating the catalyst heating metric according to formula (1), including the current amount output of NOx from the engine 12 and the temperature of the exhaust as the exhaust enters the aftertreatment system 16. Then, the metric circuit 52 determines the catalyst heating metric based on formula (1).

The control circuit 54 is configured to control the various components of the system 10 in response to the catalyst heating metric of the metric circuit 52. These commands include, but are not limited to, instructions to alter the flow of reductant from the dosing system 23, instructions to alter the air flow into the fuel injection system 14 (e.g. a richer air-fuel ratio reduces emissions), instructions to alter the intake charge within the fuel injection system 14, instructions to alter the air flow into the combustion chambers 13 via the turbocharger, and instructions to adjust the EGR valve within the EGR system 18 in order to increase or decrease the amount of exhaust gas being redirected to the engine 12. These commands may also include instructions to change the pressure of the common rail located in the fuel injection system 14, instructions to adjust the amount of fuel being injected by the fuel injection system 14 (either the main injection or the post-injection quantities), and instructions to alter the timing of the fuel injections by the fuel injection system 14. These commands may also include instructions to turn on and/or increase the heat output of the heater 21, which then heats the catalyst directly (i.e. heats the catalyst itself) or indirectly (i.e. heats the exhaust gas or another heat transmission medium that flows through or otherwise engages with the catalyst), thereby improving the ability of the catalyst to work as intended or desired. For example, heating the SCR catalyst to its desired operating temperature operates to effect desired catalytic activity out of the SCR catalyst (e.g., the NOx conversion efficiency is as intended/desired). In those embodiments in which the engine 12 is a hybrid engine, the commands from the control circuit 54 may also include instructions to alter the torque and/or speed of the engine 12.

In some embodiments, the control circuit 54 is configured to issue commands in order to minimize the catalyst heating metric at a particular instant in time (i.e. instantaneously) during the warmup period. In other embodiments, the control circuit 54 is configured to issue commands in order to minimize the catalyst heating metric on a cumulative basis over a certain predefined period of time (e.g. the warmup period). In some of these embodiments, the control circuit 54 is configured to minimize the catalyst heating metric, either at an instant in time (i.e. instantaneously) or cumulatively over a period, while factoring in various physical constraints, including but not limited to transient response of the engine 12, smoke produced from the aftertreatment system 16, hydrocarbon emissions, or engine 12 noise. In alternative embodiments, the control circuit 54 is configured to achieve a target value for the catalyst heating metric. This target value may be predefined by a user, based on a desired SCR catalyst 22 temperature, or based on a desired conversion efficiency of the SCR catalyst 22. This target value may, in some embodiments, be based on a budgeted amount of emissions that is dictated by emissions regulations for the locale. In the embodiment based on the conversion efficiency of the SCR catalyst 22, the conversion efficiency may be computed or modeled by the control circuit 54 based on expected or measured efficiencies at various temperatures of the SCR catalyst 22.

The diagnosis circuit 56 is configured or structured to compare the catalyst heating metric from the metric circuit 52 to a determined reference value for the catalyst heating metric and take corrective action accordingly. The diagnosis circuit 56 determines this reference value based on a number of factors that may influence the health of the system 10. The catalyst heating metric reference value is a desired or acceptable value for the catalyst heating metric in various situations (e.g., cold soak or cold-start conditions for the engine and system). That is to say, the catalyst heating metric reference value captures how much EONOx per unit of exhaust energy generated by the engine 12 would be acceptable for the system 10 as currently situated. To this end, the reference value takes into account the current situation for the vehicle (or generator, gen-set, etc.) in which the system 10 is included. These factors include, but are not limited to, the drive cycle (e.g. geographic location, traffic patterns, weather), engine 12 speed and load (either in the instant or predicted), age of the system 10, length of time the system 10 has been operating continuously, and total time that the SCR catalyst 22 has spent at or above the certain operating temperature (i.e. total time that the SCR catalyst 22 has been actively reducing emissions).

After determining the reference value, the diagnosis circuit 56 compares the catalyst heating metric value from the metric circuit 52 to the reference value. In some embodiments, this comparison is done at a single instant in time, over single instants in time, or in other embodiments, on a cumulative basis over a period of time. This period of time may be an arbitrary amount, an amount based on the time it takes the SCR catalyst 22 to reach the certain operating temperature, or an amount of time based on when the SCR catalyst 22 achieves a pre-defined conversion efficiency.

If the comparison shows that the catalyst heating metric is greater than the reference value, which would indicate that the system 10 is generating more NOx per unit of exhaust energy than expected, the diagnosis circuit 56 would determine that the system 10 is malfunctioning. If so, the diagnosis circuit 56 is configured to take at least one of a set of corrective actions. This set of corrective actions includes, but is not limited to, activating an auxiliary emissions system, such as the heater 21 that is coupled to the SCR catalyst 22 in order to warm the SCR catalyst without generating NOx, initiating an engine 12 de-rate in order to limit the possible NOx output, or issuing a notification of the malfunction to a user.

Figure 3:
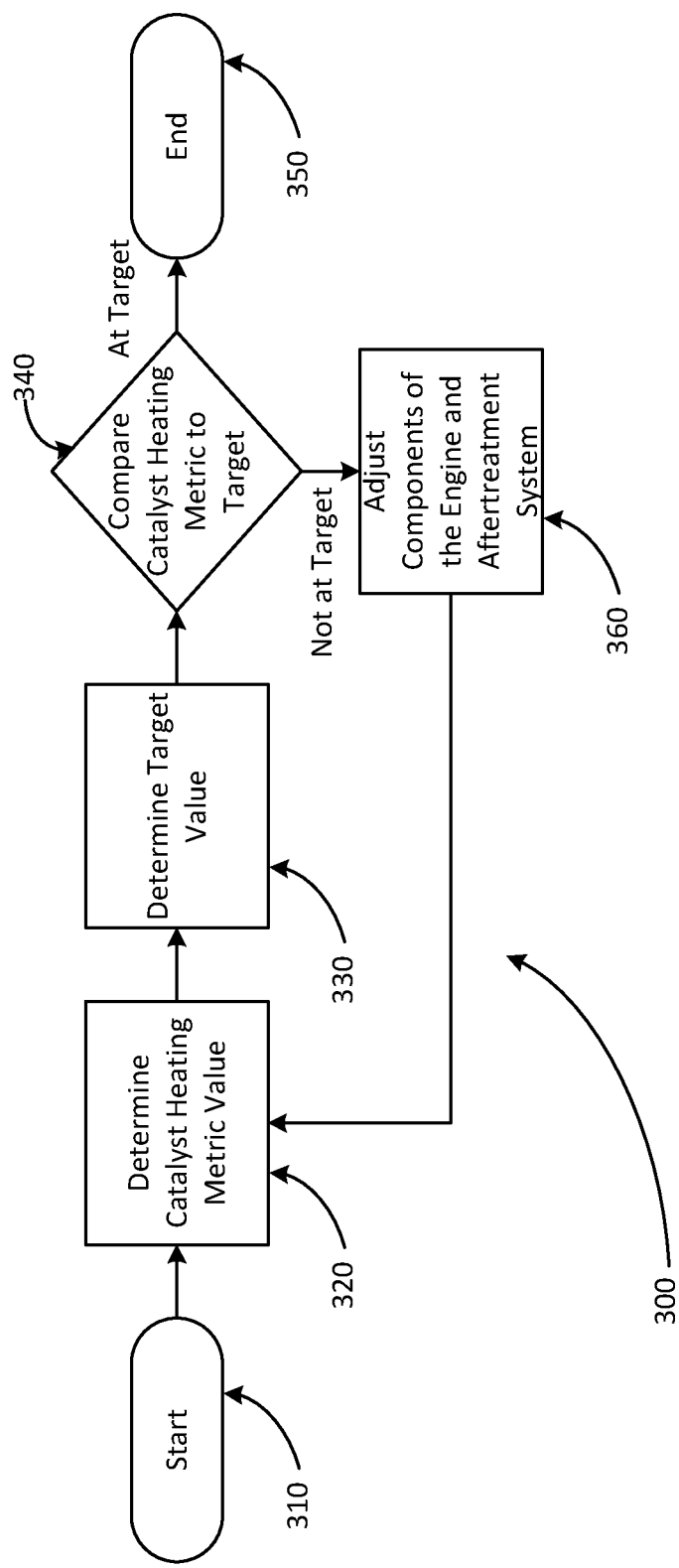
FIG. 3 is a flow diagram of a method of balancing NOx emissions from an engine with heating a selective catalytic reduction system in an aftertreatment system, according to an exemplary embodiment.

Referring now to FIG. 3, a method 300 for balancing heating the SCR system 20 in the aftertreatment system 16 while keeping NOx emissions low during a warmup period, which is defined as a period of time from a start of the engine 12 for the SCR catalyst 22 to reach a predefined operating efficiency or temperature, is shown. The method 300 begins at step 310, and then proceeds to step 320 where the catalyst heating metric value is determined and to step 330 where the target value is determined. In other embodiments, the catalyst heating metric value at step 320 occurs after the determination of the target value at step 330. At step 340, the catalyst heating metric value is compared to the target value, and the method 300 ends at step 350 if the heating metric value is at the target value, but if the heating metric value is not at the target value, the method 300 continues to step 360 and adjusts components of the engine 12 and aftertreatment system 16. Then, the method 300 returns to step 320 and again determines the catalyst heating metric value, repeating the method 300 until the catalyst heating metric value is at the target value.

Figure 4:
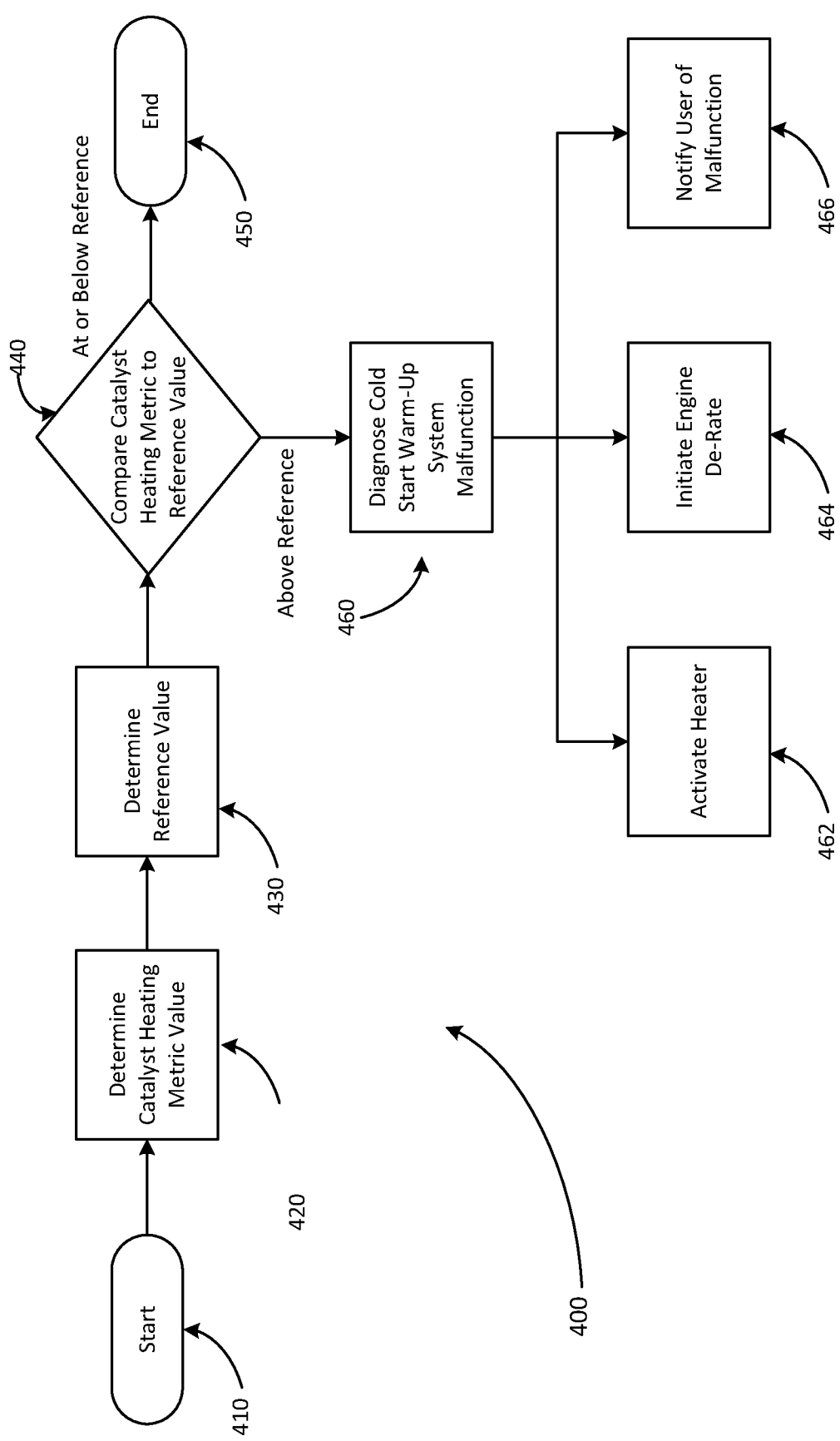
FIG. 4 is a flow diagram of a method for diagnosing a health of the system of FIG. 1, according to an exemplary embodiment.

Referring now to FIG. 4, a method 400 for diagnosing the system 10 during a warmup period, which is defined as a period of time from a start of the engine 12 for the SCR catalyst 22 to reach a predefined operating efficiency or temperature, is shown. The method 400 begins at step 410, and immediately proceeds to determine the catalyst heating metric value at step 420. Following that, the method 400 proceeds to step 430 and determines the reference value. In other embodiments, determining the catalyst heating metric value at step 420 occurs after the determination of the reference value at step 430. Next, at step 440, the catalyst heating metric value is compared to the reference value. If the catalyst heating metric value is at or below the reference value, the method 400 ends at step 450. However, if the catalyst heating metric value is above the reference value, the method 400 diagnoses a malfunction in the system 10 at step 460. Based on this malfunction, the method 400 either activates the heater 21 at step 462, initiates a de-rate of the engine 12 at step 464, or provides a notification of the malfunction to a user at step 466.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 26 may include any number of circuits for completing the functions described herein. For example, the activities and functionalities of the metric circuit 52, the control circuit 54, and the diagnosis circuit 56 may be combined in multiple circuits or as a single circuit. Additional circuits with additional functionality may also be included. Further, the controller 26 may further control other activity beyond the scope of the present disclosure.

As mentioned above and in one configuration, the "circuits" may be implemented in machine-readable medium for execution by various types of processors, such as the processor 34 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A system, comprising:
   an aftertreatment system including a catalyst; and
   a controller coupled to the aftertreatment system, wherein during a warmup period for an engine, the controller is configured to:
      determine a value regarding a mass flow rate of exhaust gas based on information received from at least one of the engine or the aftertreatment system;
      receive a target value regarding the mass flow rate of the exhaust gas; and
      control, based on the value regarding the mass flow rate of the exhaust gas, at least one of the engine, the aftertreatment system, or at least one component associated therewith to converge to the target value regarding the mass flow rate of the exhaust gas.

2. The system of claim 1, wherein the at least one component comprises at least one of a turbocharger, a fuel injection system, or an Exhaust Gas Recirculation (EGR) system.

3. The system of claim 1, wherein the warmup period is a period of time from a start of the engine to a time when the catalyst reaches a predefined operating efficiency.

4. The system of claim 3, wherein the predefined operating efficiency includes an emission conversion efficiency for the catalyst that is at or above a predefined threshold.

5. The system of claim 3, wherein the predefined operating efficiency is based on a temperature regarding the aftertreatment system.

6. The system of claim 1, wherein the catalyst is at least one of a selective catalytic reduction (SCR) catalyst, a diesel oxidation catalyst (DOC), or a three-way catalyst.

7. The system of claim 1, wherein the value and the target value are values regarding the mass flow rate of exhaust gas and an energy flow rate of the exhaust gas.

8. The system of claim 1, wherein the controller is further configured to:
   determine a reference value based on information regarding a current status of at least one of the engine or the aftertreatment system;
   compare the value regarding the mass flow rate of exhaust gas to the reference value; and
   diagnose a malfunction in the aftertreatment system in response to determining that the mass flow rate of exhaust gas exceeds the reference value.

9. A method for managing emissions from an engine, the method comprising:
   during a warmup period for the engine, determining a value regarding a mass flow rate of exhaust based on information received from at least one of the engine or an aftertreatment system;
   receiving a target value regarding the mass flow rate of exhaust; and
   controlling, based on the value regarding the mass flow rate of the exhaust gas, at least one of the engine, the aftertreatment system, or at least one component associated therewith to reach or attempt to converge to the target value.

10. The method of claim 9, wherein the at least one component comprises at least one of a turbocharger, a fuel injection system, or an Exhaust Gas Recirculation (EGR) system.

11. The method of claim 9, wherein the warmup period is a period of time from a start of the engine to a period when the catalyst reaches a predefined operating efficiency.

12. The method of claim 11, wherein the predefined operating efficiency includes an emission conversion efficiency for the catalyst that is at or above a predefined threshold.

13. The method of claim 11, wherein the predefined operating efficiency includes a temperature of the catalyst.

14. The method of claim 9, wherein the catalyst is at least one of a selective catalytic reduction (SCR) catalyst, a diesel oxidation catalyst (DOC), or a three-way catalyst.

15. A non-transitory computer-readable storage medium storing instructions therein that, when executed by one or more processors, cause the one or more processors to perform operations comprising:
   determining a value regarding a mass flow rate of exhaust;
   receiving a target value regarding the mass flow rate of exhaust; and
   controlling, based on the value regarding the mass flow rate of the exhaust gas, at least one of an engine, an aftertreatment system, or at least one component associated therewith to reach or attempt to converge to the target value regarding the mass flow rate of exhaust.

16. The non-transitory computer-readable storage medium of claim 15, wherein the at least one component comprises at least one of a turbocharger, a fuel injection system, or an Exhaust Gas Recirculation (EGR) system.

17. The non-transitory computer-readable storage medium of claim 15, wherein the warmup period is a period of time from a start of the engine to a period of time when a catalyst reaches a predefined operating efficiency.

18. The non-transitory computer-readable storage medium of claim 17, wherein the predefined operating efficiency includes an emission conversion efficiency for the catalyst that is at or above a predefined threshold.

19. The non-transitory computer-readable storage medium of claim 17, wherein the predefined operating efficiency includes a temperature of the catalyst.

20. The non-transitory computer-readable storage medium of claim 15, wherein the instructions therein that, when executed by the one or more processors, cause the one or more processors to perform operations further comprising:
   determining a reference value based on information regarding a current status of at least one of the engine or the aftertreatment system;
   comparing the value regarding the mass flow rate of exhaust gas to the reference value; and
   diagnosing a malfunction in the aftertreatment system in response to determining that the mass flow rate of exhaust gas exceeds the reference value.

\* \* \* \* \*